US011361562B2

(12) United States Patent
Snyder et al.

(10) Patent No.: US 11,361,562 B2
(45) Date of Patent: Jun. 14, 2022

(54) PATHWAY ARTICLE AUTHENTICATION

(71) Applicant: 3M INNOVATIVE PROPERTIES COMPANY, St. Paul, MN (US)

(72) Inventors: James B. Snyder, Minneapolis, MN (US); Justin M. Johnson, Hudson, WI (US); James W. Howard, Circle Pines, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 181 days.

(21) Appl. No.: 16/630,658

(22) PCT Filed: Aug. 7, 2018

(86) PCT No.: PCT/IB2018/055958
§ 371 (c)(1),
(2) Date: Jan. 13, 2020

(87) PCT Pub. No.: WO2019/030682
PCT Pub. Date: Feb. 14, 2019

(65) Prior Publication Data
US 2021/0150205 A1 May 20, 2021

Related U.S. Application Data

(60) Provisional application No. 62/580,292, filed on Nov. 1, 2017, provisional application No. 62/542,792, filed on Aug. 8, 2017.

(51) Int. Cl.
*G05D 1/02* (2020.01)
*G06K 19/06* (2006.01)
(Continued)

(52) U.S. Cl.
CPC .......... *G06V 20/80* (2022.01); *G05D 1/0212* (2013.01); *G05D 1/0246* (2013.01); *G06K 19/06037* (2013.01); *G06V 20/95* (2022.01)

(58) Field of Classification Search
None
See application file for complete search history.

(56) References Cited

U.S. PATENT DOCUMENTS

| 4,309,569 A | 1/1982 | Merkle |
| 2007/0005609 A1 | 1/2007 | Breed |

(Continued)

FOREIGN PATENT DOCUMENTS

| CN | 102364560 | 4/2014 |
| EP | 3182327 | 6/2017 |

(Continued)

OTHER PUBLICATIONS

"A Next-Generation Smart Contract and Decentralized Application Platform," Ethereum White Paper, [retrieved from the internet on Mar. 6, 2020], URL <https://github.com/ethereum/wiki/wiki/White-Paper>, (date unknown but believed to be prior to the date of the filing of the present application), 48 pages.

(Continued)

*Primary Examiner* — Kristy A Haupt

(57) ABSTRACT

The disclosure is directed to an article, such as a pathway article or a sheeting. The article includes a physical surface having a code embodied thereon. The code is associated with pathway information in transaction data stored by a blockchain managed by a consensus network of node. The pathway information indicates one or more characteristics of a vehicle pathway, wherein the pathway information provides at least one of: information descriptive of at least a portion of the vehicle pathway, or vehicle operation instructions associated with the portion of the vehicle pathway.

9 Claims, 7 Drawing Sheets

(51) Int. Cl.
   *G06V 20/80*   (2022.01)
   *G06V 20/00*   (2022.01)

(56) References Cited

U.S. PATENT DOCUMENTS

2016/0117562  A1      4/2016   Chung
2018/0343126  A1 *   11/2018   Fallah ................... H04L 9/006

FOREIGN PATENT DOCUMENTS

WO    WO 2016-058635    4/2016
WO    WO 2016-109620    7/2016

OTHER PUBLICATIONS

Crosby, "BlockChain Technology Beyond Bitcoin," Sutardja Center for Entrepreneurship & Technology Technical Report, Berkeley Engineering, Oct. 2015, 35 pages.
International Search Report for PCT International Application No. PCT/IB2018/055958, dated Nov. 26, 2018, 5 pages.

\* cited by examiner

PATHWAY ARTICLE AUTHENTICATION

CROSS REFERENCE TO RELATED APPLICATIONS

This application is a national stage filing under 35 U.S.C. 371 of PCT/IB2018/055958, filed Aug. 7, 2018, which claims the benefit of U.S. Provisional Application No. 62/542,792, filed Aug. 8, 2017, and U.S. Provisional Application No. 62/580,292, filed Nov. 1, 2017, the disclosures of which are incorporated by reference in their entireties herein.

TECHNICAL FIELD

The present application relates generally to pathway articles and systems in which such pathway articles may be used.

BACKGROUND

Current and next generation vehicles may include those with a fully automated guidance systems, semi-automated guidance and fully manual vehicles. Semi-automated vehicles may include those with advanced driver assistance systems (ADAS) that may be designed to assist drivers avoid accidents. Automated and semi-automated vehicles may include adaptive features that may automate lighting, provide adaptive cruise control, automate braking, incorporate GPS/traffic warnings, connect to smartphones, alert driver to other cars or dangers, keep the driver in the correct lane, show what is in blind spots and other features. Infrastructure may increasingly become more intelligent by including systems to help vehicles move more safely and efficiently such as installing sensors, communication devices and other systems. Over the next several decades, vehicles of all types, manual, semi-automated and automated, may operate on the same roads and may need operate cooperatively and synchronously for safety and efficiency.

SUMMARY

In general, the disclosure is directed to articles, systems, and methods of authenticating, with a computing device associated with a vehicle, pathway articles that affect operation of the vehicle using article information embodied on a surface of the article. For example, the article information may correspond to information stored on a blockchain managed by a consensus network. A pathway-article assisted vehicle (PAAV) may locally obtain the article information, determine whether the article is authentic, and control operation of the PAAV based on the article in response to determining the article is authentic. In this way, the techniques may enhance the efficiency and safety with which PAAVs are able to navigate a pathway. While the techniques described herein may be applied to a roadway (e.g., for passenger cars and trucks), the techniques may also be applied in warehouses, factories, airports, underground or pit mines, airways, waterways or any other setting in which a pathway is navigated by manually operated vehicles as well as PAAVs.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
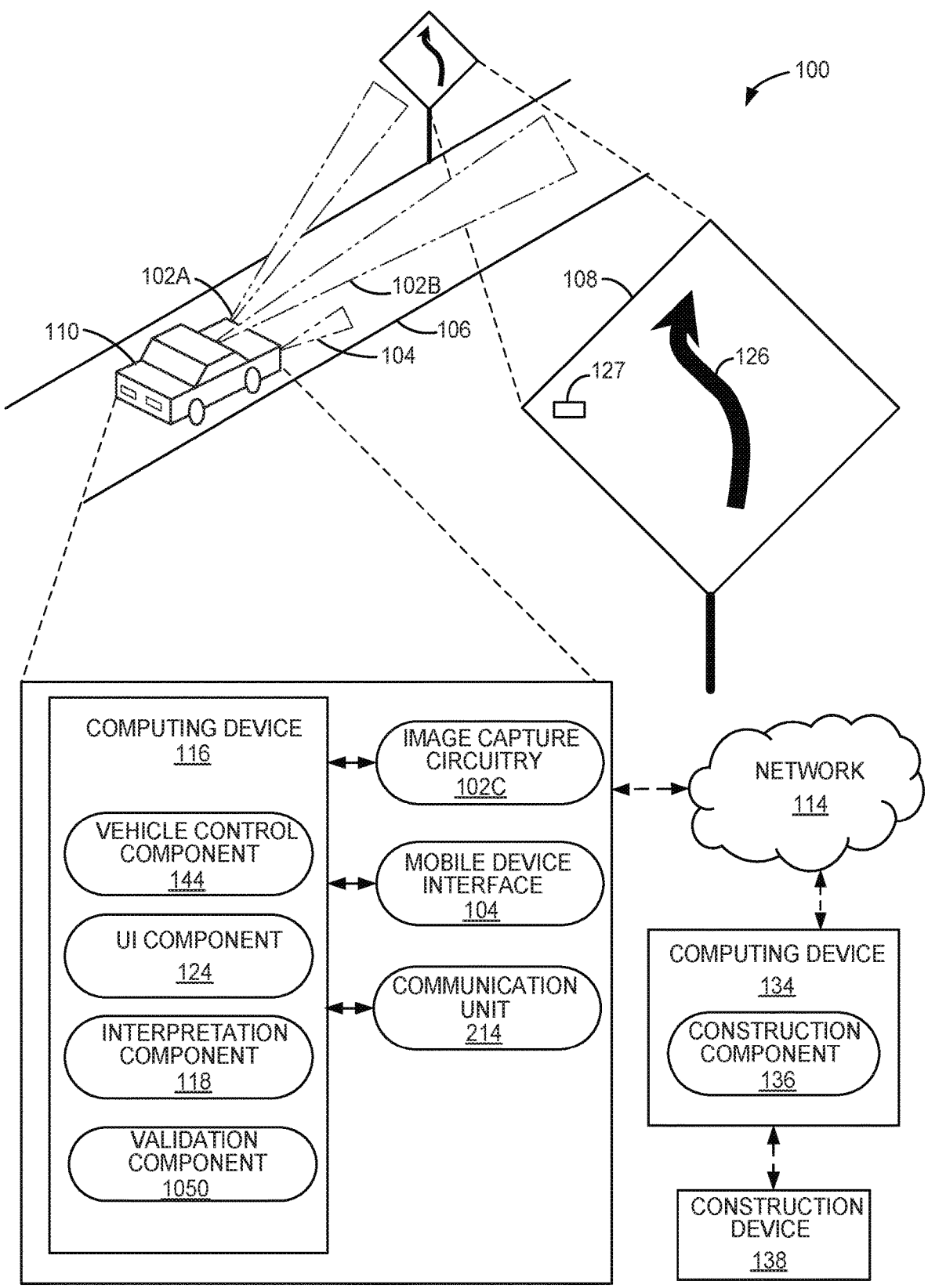
FIG. 1 is a block diagram illustrating an example system that includes a pathway article and a PAAV, in accordance with techniques of this disclosure.

Even with advances in autonomous driving technology, infrastructure, including vehicle roadways, may have a long transition period during which fully autonomous vehicles, vehicles with advanced Automated Driver Assist Systems (ADAS), and traditional fully human operated vehicles share the road. Some practical constraints may make this transition period decades long, such as the service life of vehicles currently on the road, the capital invested in current infrastructure and the cost of replacement, and the time to manufacture, distribute, and install fully autonomous vehicles and infrastructure.

Autonomous vehicles and ADAS, which may be referred to as semi-autonomous vehicles, may use various sensors to perceive the environment, infrastructure, and other objects around the vehicle. These various sensors combined with onboard computer processing may allow the automated system to perceive complex information and respond to it more quickly than a human driver. In this disclosure, a vehicle may include any vehicle with or without sensors, such as a vision system, to interpret a vehicle pathway. A vehicle with vision systems or other sensors that takes cues from the vehicle pathway may be called a pathway-article assisted vehicle (PAAV). Some examples of PAAVs may include the fully autonomous vehicles and ADAS equipped vehicles mentioned above, as well as unmanned aerial vehicles (UAVs) (aka drones), human flight transport devices, underground pit mining ore carrying vehicles, forklifts, factory part or tool transport vehicles, ships and other watercraft and similar vehicles. A vehicle pathway may be a road, highway, a warehouse aisle, factory floor or a pathway not connected to the earth's surface. The vehicle pathway may include portions not limited to the pathway itself. In the example of a road, the pathway may include the road shoulder, physical structures near the pathway such as toll booths, railroad crossing equipment, traffic lights, the sides of a mountain, guardrails, and generally encompassing any other properties or characteristics of the pathway or objects/structures in proximity to the pathway.

In accordance with techniques of this disclosure, an article includes a code embodied on a physical surface of the article, the code corresponding to authentication information for the article. Authentication information may generally refer to information used to authenticate an article. The code is configured to be interpreted by an PAAV, but in some examples, may be interpreted by a human driver. The authentication information may correspond to information stored on a blockchain that is managed by a consensus network and is used to authenticate the article. In some examples, a PAAV may determine whether an article (e.g., a traffic sign, pavement marker, etc.) is authentic based on the code and information stored within the blockchain. In some examples, the code may be associated with pathway information that is stored on a blockchain managed by a consensus network.

An article may include an article message embodied on the physical surface of the pathway article. In this disclosure, an article message may include images, graphics, characters, such as numbers or letters or any combination of characters, symbols or non-characters. An article message may include pathway information. Pathway information may generally refer to information describing the pathway (e.g., a number of lanes, lane width, pathway curvature, grade or slope, etc.) or vehicle operation instructions associated with the pathway (e.g., stop, yield, curve ahead, speed limit, etc.). In some examples, pathway information associated with an article and/or portion of vehicle pathway may also be stored on a blockchain that is managed by a consensus network and usable for controlling a PAAV.

Using the authentication information to determine whether an article is authentic or not authentic (e.g., counterfeit) may provide a robust, secure system for improving pathway recognition, which may improve vehicle and occupant safety during operation of the vehicle.

FIG. 1 is a block diagram illustrating an example system 100 that includes a pathway article that is configured to be interpreted by an PAAV in accordance with techniques of this disclosure. System 100 includes PAAV 110 and one or more articles 108.

In some examples, article 108 may include a pathway article, such as a traffic sign (e.g., a stop sign, yield sign, mile marker, etc.), a pavement marker, license plate, temporary traffic sign, conspicuity tape, and other infrastructure articles. In some examples, article 108 may be a sheeting (also referred to as a coating), such as a reflective, non-reflective, and/or retroreflective sheet. In examples where article 108 is a sheeting, article 108 may be applied to a base surface of a pathway article. The sheeting may be applied to a base surface using one or more techniques and/or materials including but not limited to: mechanical bonding, thermal bonding, chemical bonding, or any other suitable technique for attaching retroreflective sheet to a base surface. A base surface may include any surface of an object (e.g., an aluminum plate) to which the sheeting may be attached to article 108.

System 100 may include computing device 134, which may control construction device 138. Computing device 134 may include or receive a printing specification that defines one or more properties of article 108. For example, computing device 134 may receive printing specification information included in the Manual on Uniform Traffic Control Devices (MUTCD) from the U.S. Department of Transportation (DOT), or similar regulatory information found in other countries or jurisdictions, that define the requirements for size, color, shape and other properties of pathway articles used on vehicle pathways. A printing specification may also include properties of manufacturing the barrier layer, retroreflective properties and other information that may be used to generate a pathway article.

Construction component 136 of computing device 134 may generate construction data to form an article message on an optically active device, which will be described in more detail below. The construction data may be a combination of the printing specification, authentication information, and pathway information. Construction data generated by construction component 136 may cause construction device 138 to dispose the article message on a substrate in accordance with the printing specification, the authentication information, the pathway information, or a combination therein.

Article 108 may include at least one article message 126, such as but not limited to characters, images, and/or any other information. The article message may be printed, formed, attached to, adhered to, or otherwise embodied on the article 108. In some examples, such as when article 108 is a sheeting, the article message may be printed, formed, or otherwise embodied on the sheeting using any one or more of an ink, a dye, a thermal transfer ribbon, a colorant, a pigment, and/or an adhesive coated film. In some examples, such as when article 108 is a pathway article, the article message may be printed, formed, or otherwise embodied on the base surface (e.g., printed directly on the base surface) of article 108.

Article message 126 may include a human readable graphical symbol, such as an arrow as illustrated in FIG. 1. However, article message 126 may include any graphical representation indicative of pathway information associated with pathway 106, such as text (e.g., "STOP", "Speed limit: 40 MPH", etc.). Article message 126 may represent pathway information that describes a characteristic of vehicle pathway 106, such as an impending curve. In some examples, the pathway information may include vehicle operation instructions associated with vehicle pathway 106, such as a speed limit, instructions to stop, yield, turn only on red, etc. In some examples, article message 126 may be interpreted by both a human operator of PAAV 110 as well as computing device 116 onboard PAAV 110.

In accordance with techniques of this disclosure, article 108 includes a code 127 embodied thereon. In some examples, code 127 (sometimes referred to as a security element) may be any portion of article message 126 that is printed, formed, or otherwise embodied on article 108 that facilitates the detection of counterfeit articles. Code 127 includes authentication information that is machine readable. In some examples, the authentication information of code 127 corresponds to data stored by a blockchain managed by a consensus network. In some instances, the authentication information includes a unique identifier corresponding to article 108. The authentication information may include an indication of a location (e.g., GPS coordinates, city, street, intersection) of article 108 and/or an indication of a type of article 108 (e.g., stop, yield, speed limit, etc.). In some examples, code 127 includes a barcode (e.g., a 2D barcode, such as a QR code), such that the authentication information may be encoded in the barcode.

In some examples, the code 127 may be printed on a label, tape, sticker, or other adhesive device. The adhesive device may include at least one adhesive or cling-film layer to affix to article 108. In some examples, the code 127 may be printed or otherwise embodied on an article different from the article 108 and attached to article 108 using fasteners, such as screws, nails, glue, Velcro, and so forth.

In some examples, the information conveyed by article 108 is substantially the code 127 in that there is no other article information associated with the article. For instance, article 108 is depicted as a road sign in FIG. 1 that depicts with pathway information. In some examples, article 108 does not depict pathway information.

In some examples, code 127 is detectable outside the visible light spectrum (e.g., infrared) and is not detectable in the visible light spectrum. Non-visible components in FIG. 1 are described for illustration purposes as being formed by different areas that either retroreflect or do not retroreflect light. Non-visible components in FIG. 1 may be printed, formed, or otherwise embodied in a pathway article using any light reflecting technique in which information may be determined from non-visible components. For instance, non-visible components may be printed using visibly-opaque, infrared-transparent ink and/or visibly-opaque, infrared-opaque ink. In some examples, non-visible components may be placed on article 108 by employing polarization techniques, such as right circular polarization, left circular polarization or similar techniques.

As shown in FIG. 1, system 100 includes PAAV 110 that may operate on vehicle pathway 106. As described herein, PAAV generally refers to a vehicle with a vision system, along with other sensors, that may interpret the vehicle pathway and the vehicle's environment, such as other vehicles or objects. A PAAV may interpret information from the vision system and other sensors, make decisions and take actions to navigate the vehicle pathway.

PAAV 110 of system 100 may be an autonomous or semi-autonomous vehicle, such as an ADAS. In some examples PAAV 110 may include occupants that may take full or partial control of PAAV 110. PAAV 110 may be any type of vehicle designed to carry passengers or freight including small electric powered vehicles, large trucks or lorries with trailers, vehicles designed to carry crushed ore within an underground mine, or similar types of vehicles. PAAV 110 may include lighting, such as headlights in the visible light spectrum as well as light sources in other spectrums, such as infrared. PAAV 110 may include other sensors such as radar, sonar, lidar, GPS and communication links for the purpose of sensing the vehicle pathway, other vehicles in the vicinity, environmental conditions around the vehicle and communicating with infrastructure. For example, a rain sensor may operate the vehicles windshield wipers automatically in response to the amount of precipitation, and may also provide inputs to the onboard computing device 116.

As shown in FIG. 1, PAAV 110 of system 100 may include image capture devices 102A and 102B, collectively referred to as image capture devices 102. Image capture devices 102 may convert light or electromagnetic radiation sensed by one or more image capture sensors into information, such as digital image or bitmap comprising a set of pixels. Each pixel may have chrominance and/or luminance components that represent the intensity and/or color of light or electromagnetic radiation. In general, image capture devices 102 may be used to gather information about a pathway. Image capture devices 102 may send image capture information to computing device 116 via image capture circuitry 102C. Image capture devices 102 may capture lane markings, centerline markings, edge of roadway or shoulder markings, as well as the general shape of the vehicle pathway. The general shape of a vehicle pathway may include turns, curves, incline, decline, widening, narrowing or other characteristics. Image capture devices 102 may have a fixed field of view or may have an adjustable field of view. An image capture device with an adjustable field of view may be configured to pan left and right, up and down relative to PAAV 110 as well as be able to widen or narrow focus. In some examples, image capture devices 102 may include a first lens and a second lens.

Image capture devices 102 may include one or more image capture sensors and one or more light sources. In some examples, image capture devices 102 may include image capture sensors and light sources in a single integrated device. In other examples, image capture sensors or light sources may be separate from or otherwise not integrated in image capture devices 102. As described above, PAAV 110 may include light sources separate from image capture devices 102. Examples of image capture sensors within image capture devices 102 may include semiconductor charge-coupled devices (CCD) or active pixel sensors in complementary metal-oxide-semiconductor (CMOS) or N-type metal-oxide-semiconductor (NMOS, Live MOS) technologies. Digital sensors include flat panel detectors. In one example, image capture devices 102 includes at least two different sensors for detecting light in two different wavelength spectrums.

In some examples, one or more light sources 104 include a first source of radiation and a second source of radiation. In some embodiments, the first source of radiation emits radiation in the visible spectrum, and the second source of radiation emits radiation in the near infrared spectrum. In other embodiments, the first source of radiation and the second source of radiation emit radiation in the near infrared spectrum. As shown in FIG. 1 one or more light sources 104 may emit radiation in the near infrared spectrum.

Image capture circuitry 102C may receive information from the plurality of image capture devices, such as image capture devices 102, perform image processing, such as filtering, amplification, and the like, and send image information to computing device 116. Other components of PAAV 110 that may communicate with computing device 116 may include mobile device interface 104, and communication unit 214. In some examples image capture circuitry 102C, mobile device interface 104, and communication unit 214 may be separate from computing device 116 and in other examples may be a component of computing device 116.

Mobile device interface 104 may include a wired or wireless connection to a smartphone, tablet computer, laptop computer or similar device. In some examples, computing device 116 may communicate via mobile device interface 104 for a variety of purposes such as receiving traffic information, address of a desired destination or other purposes. In some examples computing device 116 may communicate to external networks 114, e.g. the cloud, via mobile device interface 104. In other examples, computing device 116 may communicate via communication units 214.

One or more communication units 214 of computing device 116 may communicate with external devices by transmitting and/or receiving data. For example, computing device 116 may use communication units 214 to transmit and/or receive radio signals on a radio network such as a cellular radio network or other networks, such as networks 114. In some examples communication units 214 may transmit and receive messages and information to other vehicles, such as information interpreted from article 108. In some examples, communication units 214 may transmit and/or receive satellite signals on a satellite network such as a Global Positioning System (GPS) network.

In the example of FIG. 1, computing device 116 includes vehicle control component 144, a user interface (UI) component 124, an interpretation component 118, and a validation component 1050. Components 118, 144, 124, and 1050 may perform operations described herein using software, hardware, firmware, or a mixture of both hardware, software, and firmware residing in and executing on computing device 116 and/or at one or more other remote computing devices. In some examples, components 118, 144, 124, and 1050 may be implemented as hardware, software, and/or a combination of hardware and software.

Computing device 116 may execute components 118, 124, 144, and 1050 with one or more processors. Computing device 116 may execute any of components 118, 124, 144, 1050 as or within a virtual machine executing on underlying hardware. Components 118, 124, 144, 1050 may be implemented in various ways. For example, any of components 118, 124, 144, 1050 may be implemented as a downloadable or pre-installed application or "app." In another example, any of components 118, 124, 144, 1050 may be implemented as part of an operating system of computing device 116. Computing device 116 may include inputs from sensors not shown in FIG. 1 such as engine temperature sensor, speed sensor, tire pressure sensor, air temperature sensors, an inclinometer, accelerometers, light sensor, and similar sensing components.

UI component 124 may include any hardware or software for communicating with a user of PAAV 110. In some examples, UI component 124 includes outputs to a user such as displays, such as a display screen, indicator or other lights, audio devices to generate notifications or other audible functions. UI component 24 may also include inputs such as knobs, switches, keyboards, touch screens or similar types of input devices.

Vehicle control component 144 may include for example, any circuitry or other hardware, or software that may control or adjust one or more functions of the vehicle. Some examples include adjustments to change a speed of the vehicle, change the status of a headlight, changing a damping coefficient of a suspension system of the vehicle, apply a force to a steering system of the vehicle or change the interpretation of one or more inputs from other sensors. For example, an IR capture device may determine an object near the vehicle pathway has body heat and change the interpretation of a visible spectrum image capture device from the object being a non-mobile structure to a possible large animal that could move into the pathway. Vehicle control component 144 may further control the vehicle speed as a result of these changes. In some examples, the computing device controls one or more functions of the PAAV based on the pathway information detected by one or more image capture devices 102.

Interpretation component 118 may receive infrastructure or pathway information about vehicle pathway 106 and determine one or more characteristics of vehicle pathway 106. For example, interpretation component 118 may receive images from image capture devices 102 and/or other information from systems of PAAV 110 in order to make determinations about characteristics of vehicle pathway 106. As described below, in some examples, interpretation component 118 may transmit such determinations to vehicle control component 144, which may control PAAV 110 based on the information received from interpretation component. In other examples, computing device 116 may use information from interpretation component 118 to generate notifications for a user of PAAV 110, e.g., notifications that indicate a characteristic or condition of vehicle pathway 106.

According to aspects of this disclosure, in operation, interpretation component 118 may receive an image of article 108 via image capture circuitry 102C and interpret information embodied on the surface of article. For example, image capture circuitry 102C may detect code 127 for authenticating and/or obtaining pathway information for article 108. Similarly, image capture circuitry 102C may detect article message 126 and may determine that article 108 includes pathway information. The authentication information and/or pathway information of this disclosure is just one piece of redundant information that computing device 116, or a human operator, may consider when operating a vehicle. Other information may include information from other sensors, such as radar or ultrasound distance sensors, lane markings on the vehicle pathway captured from image capture devices 102, information from GPS, and the like.

Validation component 1050 determines whether article 108 is authentic or counterfeit based at least in part on the authentication information of article 108. For example, the authentication information may include a unique identifier corresponding to article 108. In some examples, validation component 1050 determines whether article 108 is authentic or counterfeit by comparing the unique identifier corresponding to article 108 to one or more unique identifiers associated with a hierarchical tree or blockchain.

In one example, computing device 116 may store at least a portion of a blockchain that includes information associated with a plurality of pathway articles 108. Validation component 1050 may determine whether the unique identifier corresponding to article 108 corresponds to (e.g., matches) an identifier stored in the blockchain. In such examples, validation component 1050 may determine that article 108 is authentic if the unique identifier corresponding to article 108 corresponds to an identifier within the blockchain. Similarly, validation component 1050 may determine that article 108 is not authentic (e.g., counterfeit) if the unique identifier corresponding to article 108 does not correspond to an identifier within the blockchain.

Responsive to determining that article 108 is not authentic, computing device 116 may execute a first action. For example, vehicle control component 144 may maintain the operation of PAAV 110 (e.g., by maintaining the current speed and trajectory of PAAV 110). As another example, UI component 144 may output an alert (e.g., audible, visual, etc.) that article 108 is not authentic. In some instances, UI component 144 may output the alert for consumption by a passenger within PAAV 110, to a law enforcement agency, government agency (e.g., department of transportation), or any combination therein.

Responsive to determining that article 108 is authentic, computing device executes a second action (e.g., different from the first action). For example, vehicle control component 144 may alter the operation of PAAV 110 based on the pathway information of article 108 determined by validation component 1050. For instance, in response to determining that article 108 is authentic and is a STOP sign, computing device 116 may output a notification (e.g., audible, visual, etc.), alter operation of the vehicle, or both. For instance, UI component 124 may output a visual notification (e.g., via a display component) to one or more of occupants of the PAAV 110 indicating that article 108 is a STOP sign and/or vehicle control component 144 may bring PAAV 110 to a stop.

Utilizing a blockchain to store authentication information associated with pathway articles may provide a more robust, more secure system storing information about a pathway article. A computing device may detect a code embodied on the pathway article, verify the authenticity of the pathway article, and obtain additional information about the pathway based on the blockchain data. In this way, the computing device may more accurately determine pathway information (e.g., vehicle operating instructions or pathway characteristics) by the pathway article and reduce the computations used to determine the pathway information, which may improve vehicle and occupant safety during operation of the vehicle.

Figure 2:
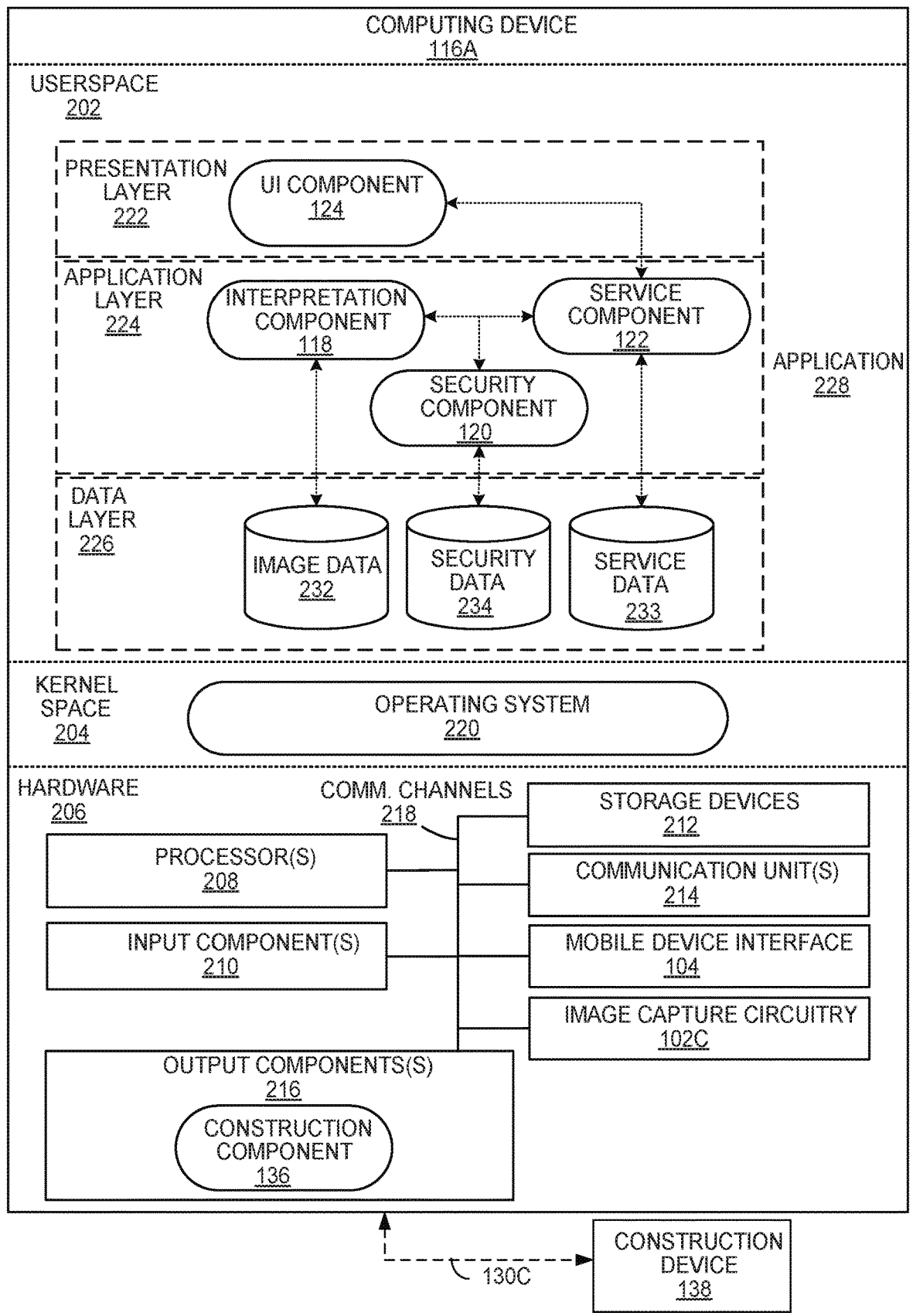
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one example of computing device 116A. Many other examples of computing device 116A may be used in other instances and may include a subset of the components included in example computing device 116A or may include additional components not shown example computing device 116A in FIG. 2.

In some examples, computing device 116A may be a server, tablet computing device, smartphone, wrist- or head-worn computing device, laptop, desktop computing device, or any other computing device that may run a set, subset, or superset of functionality included in application 228. In some examples, computing device 116A may correspond to vehicle computing device 116 onboard PAAV 110, depicted in FIG. 1. In other examples, computing device 116A may also be part of a system or device that produces signs such as article 108 and may correspond to computing device 134 depicted in FIG. 1.

As shown in the example of FIG. 2, computing device 116A may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads than user space 202. For instance, kernel space 204 may include operating system 220, which operates with higher privileges than components executing in user space 202.

As shown in FIG. 2, hardware 206 includes one or more processors 208, input components 210, storage devices 212, communication units 214, output components 216, mobile device interface 104, and image capture circuitry 102C. Processors 208, input components 210, storage devices 212, communication units 214, output components 216, mobile device interface 104, and image capture circuitry 102C may each be interconnected by one or more communication channels 218. Communication channels 218 may interconnect each of the components 102C, 104, 208, 210, 212, 214, and 216 for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within computing device 116A. For example, processors 208 on computing device 116A may receive and execute instructions stored by storage devices 212 that provide the functionality of components included in kernel space 204 and user space 202. These instructions executed by processors 208 may cause computing device 116A to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 242 of computing device 116A may receive input. Examples of input are tactile, audio, kinetic, and optical input, to name only a few examples. Input components 242 of computing device 116A, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more communication units 214 of computing device 116A may communicate with external devices by transmitting and/or receiving data. For example, computing device 116A may use communication units 214 to transmit and/or receive radio signals on a radio network such as a cellular radio network. In some examples, communication units 214 may transmit and/or receive satellite signals on a satellite network such as a Global Positioning System (GPS) network. Examples of communication units 214 include a network interface card (e.g. such as an Ethernet card), an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

In some examples, communication units 214 may receive data that includes pathway information, such as information indicative of one or more characteristics of a vehicle pathway or vehicle operation instructions associated with the pathway. In some examples, such as examples where computing device 116A is part of a system or device that produces articles 108, communication units 214 may receive pathway information, from a test vehicle, handheld device, or other means that may gather data that indicates the characteristics of a vehicle pathway. Computing device 116A may receive updated information, upgrades to software, firmware and similar updates via communication units 214.

One or more output components 216 of computing device 116A may generate output. Examples of output are tactile, audio, and video output. Output components 216 of computing device 116A, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 216 may be integrated with computing device 116A in some examples.

In other examples, output components 216 may be physically external to and separate from computing device 116A, but may be operably coupled to computing device 116A via wired or wireless communication. An output component may be a built-in component of computing device 116A located within and physically connected to the external packaging of computing device 116A (e.g., a screen on a mobile phone). In another example, a presence-sensitive display may be an external component of computing device 116A located outside and physically separated from the packaging of computing device 116A (e.g., a monitor, a projector, etc. that shares a wired and/or wireless data path with a tablet computer).

Output components 216 may include construction component 136 (e.g., in the example where computing device 116A is a part of a system or device that produces articles 108, such as described in relation to computing device 134 in FIG. 1.) Construction component 136 may send construction data to construction device, such as construction device 138 that causes construction device 138 to print a code and/or an article message. The code and article message may include both machine-readable and human readable elements. Construction component 136 may provide construction data to construction device 138 to form the code and/or article message on article 108 (e.g., a sheeting or pathway article).

One or more storage devices 212 within computing device 116A may store information for processing during operation of computing device 116A. In some examples, storage device 212 is a temporary memory, meaning that a primary purpose of storage device 212 is not long-term storage. Storage devices 212 on computing device 116A may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 212, in some examples, also include one or more computer-readable storage media. Storage devices 212 may be configured to store larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 2, application 228 executes in userspace 202 of computing device 116A. Application 228 may be logically divided into presentation layer 222, application layer 224, and data layer 226. Presentation layer 222 may include user interface (UI) component 228, which generates and renders user interfaces of application 228. Application 228 may include, but is not limited to: UI component 124, interpretation component 118, security component 120, and one or more service components 122. For instance, application layer 224 may interpretation component 118, service component 122, and security component 120. Presentation layer 222 may include UI component 124.

Data layer 226 may include one or more datastores. A datastore may store data in structure or unstructured form. Example datastores may be any one or more of a relational database management system, online analytical processing database, table, hierarchical tree, blockchain, or any other suitable structure for storing data. Image data 232 may include one or more images that are received from one or more image capture devices, such as image capture devices 102 described in relation to FIG. 1. In some examples, the images are bitmaps, Joint Photographic Experts Group images (JPEGs), Portable Network Graphics images (PNGs), or any other suitable graphics file formats. Security data 234 may include authentication and/or pathway information associated with one or more articles (e.g., article 108). For example, computing device 116B may be a node on a consensus network and may store blockchain information that includes authentication information and/or pathway information associated with a plurality of articles 108. Service data 233 may include any data to provide and/or resulting from providing a service of service component 122.

In some examples, computing device 116A may communicate with construction device 138 to initially manufacture or otherwise create article 108 with a code, and optionally, an article message. Construction device 138 may be used in conjunction with computing device 116A, which may control the operation of construction device 138, as in the example of computing device 134 of FIG. 1. In some examples, construction device 138 may be any device that prints, disposes, or otherwise forms the code 127 and article message 126 on article 108. Examples of construction device 138 include but are not limited to a needle die, gravure printer, screen printer, thermal mass transfer printer, laser printer/engraver, laminator, flexographic printer, an ink-jet printer, an infrared-ink printer.

In some examples, article 108 may be a sheeting (e.g., a retroreflective sheeting) constructed by construction device 138, and a separate construction process or device, which is operated in some cases by a different operators or entities than construction device 138, may apply the code to the sheeting, or may apply the sheeting to a base layer (e.g., aluminum plate) of a pathway article. In other words, in some examples, article 108 is sheeting that includes a code and which may be coupled to a base layer of a pathway article. In some examples, article 108 is a pathway article that includes a code.

Construction device 138 may be communicatively coupled to computing device 116A by a communication link 130C. Computing device 116A may control the operation of construction device 138 or may generate and send construction data to construction device 138. Computing device 116A may include one or more printing specifications. A printing specification may comprise data that defines properties (e.g., location, shape, size, pattern, composition or other spatial characteristics) of a code 127, article message 126, or both on article 108. In some examples, the printing specification may be generated by a human operator or by a machine. In any case, construction component 136 may send data to construction device 138 that causes construction device 138 to print or otherwise encode a code and an article message on article 108.

In some examples construction device 138 may be at a location remote from the location of the signs. In other examples, construction device 138 may be mobile, such as installed in a truck, van or similar vehicle, along with an associated computing device, such as computing device 134 or 116A. A mobile construction device may have advantages when local vehicle pathway conditions indicate the need for a temporary or different sign. For example, in the event of a road washout, where there is only one lane remaining, in a construction area where the vehicle pathway changes frequently, or in a warehouse or factory where equipment or storage locations may change. A mobile construction device may receive construction data, as described, and create article 108 at the location where article 108 may be needed. In some examples, the vehicle carrying the construction device may include sensors that allow the vehicle to traverse the changed pathway and determine pathway characteristics. In some examples, a sheeting containing a code may be removed from a pathway article base layer and replaced with an updated sheeting containing a code. This may have an advantage in cost savings.

In accordance with techniques of this disclosure, computing device 116A may cause authentication information associated with one or more articles 108 to be stored to a blockchain. In some examples, as described in more detail in FIG. 4, computing device 116A may register one or more articles 108 to the blockchain and the authentication information may include one or more unique identifiers that each correspond to a respective article 108. For example, computing device 116A may generate a set of unique identifiers and may send the set of unique identifiers to one or more computing devices (e.g., nodes) that store a blockchain in order to register the set of unique identifiers on the blockchain. In some examples, computing device 116A may request a set of available unique identifiers from one or more computing devices that host the blockchain and may receive an indication of a set of available unique identifiers.

Responsive to receiving a set of unique identifiers or generating the set of unique identifiers, computing device 116A may send an indication of the set of unique identifiers to construction device 138. Construction device 138 may construct one or more articles 108 such that each article 108 includes an indication of respective identifier from the set of identifiers. For example, when article 108 is a sheeting, construction device 138 may print or otherwise encode a code (e.g., as a 2-D barcode, such as a QR code) representative of, at least in part, the unique identifier corresponding to the sheeting on the sheeting in order to uniquely identify the sheeting. In some examples, an operator (e.g., the same entity that creates the sheeting, or a different entity) may apply the sheeting to a pathway article. In such examples, computing device 116A may associate a unique identifier for the particular sheeting identified with additional authentication information corresponding to a particular pathway article. For instance, computing device 116A may associate the particular sheeting with a type of sign (e.g., a STOP sign, a YIELD sign, etc.) or an installation location (e.g., GPS coordinates, a city, state, intersection, etc.). Computing device 116 may send the additional authentication information corresponding to article 108 to a computing device (e.g., a device that is part of a consensus network) that stores the blockchain in order to register the additional authentication information to the blockchain and to associate the unique identifier with the additional authentication information.

As another example (e.g., when article 108 is a pathway article), construction device 138 may construct the article 108 such that article 108 includes an indication of the unique identifier (e.g., a 2-D barcode, such as a QR code) corresponding to the article 108. In such examples, computing device 116A may associate article 108 with a unique identifier and additional authentication information. For instance, computing device 116A may associate the unique identifier represented by the code and that corresponds to article 108 with a type of article (e.g., a STOP sign, a YIELD sign, etc.), or an installation location (e.g., GPS coordinates, a city, state, intersection, etc.) of the article. Computing device 116A may send the additional information corresponding to article 108 to a computing device (e.g., a device that is part of the consensus network) storing the blockchain in order to register an association between the first authentication information (e.g., a unique identifier) and additional authentication information to the blockchain.

In some examples, an entity that installs a pathway article may include pathway information associated with the pathway article, such as one or more characteristics of the pathway at which the pathway article is installed. Thus, in such examples, computing device 116A may send the pathway information to the consensus network to register an association between authentication information corresponding to an article and pathway information associated with the article.

Figure 3:
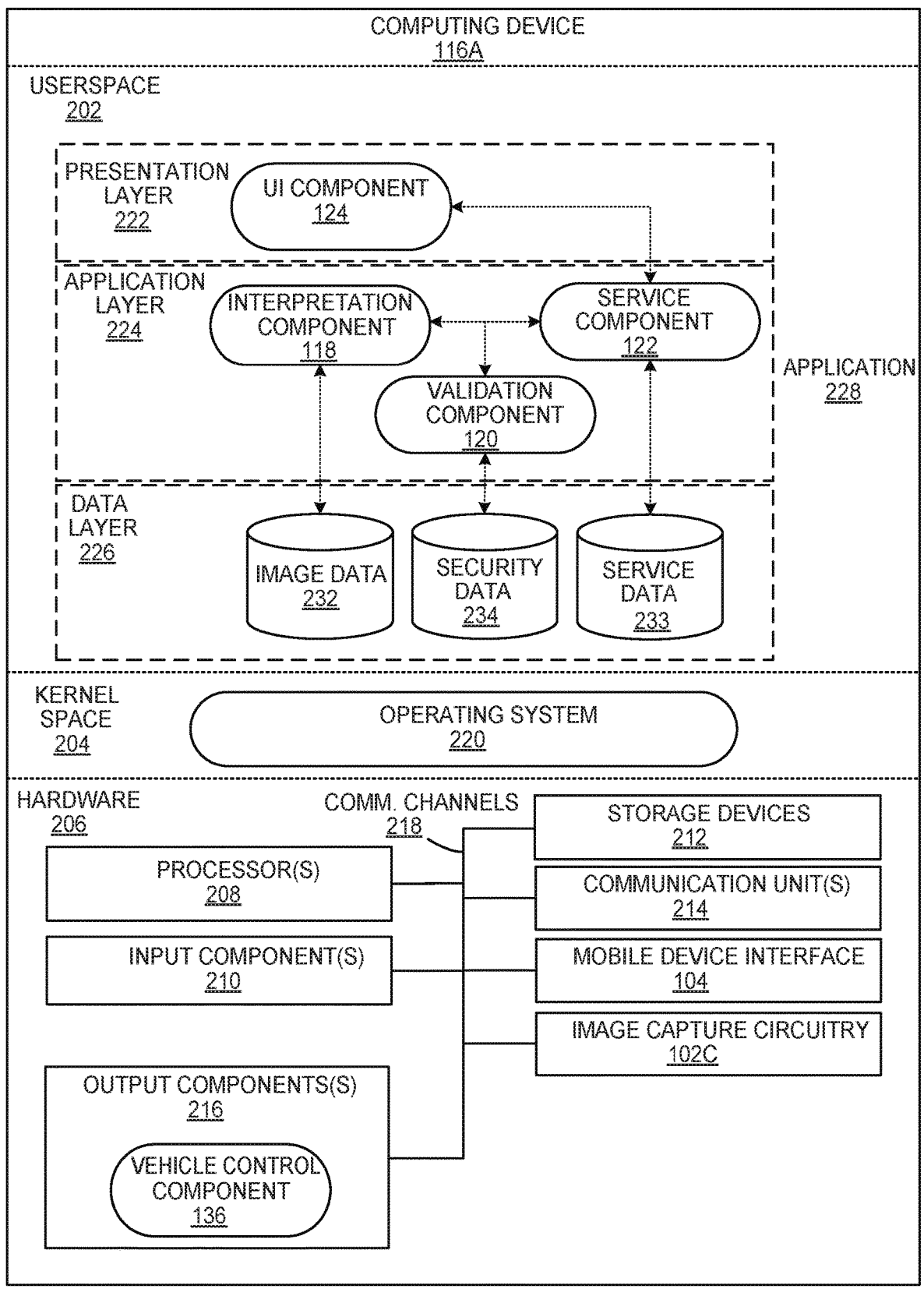
FIG. 3 is a block diagram illustrating an example computing device, in accordance with one or more aspects of the present disclosure.

FIG. 3 is a block diagram illustrating an example computing device, in accordance with one or more aspects of the present disclosure. FIG. 3 illustrates only one example of a computing device 116B, which may be incorporated in a PAAV. Many other examples of computing device 116B may be used in other instances and may include a subset of the components included in example computing device 116B or may include additional components not shown example computing device 116B in FIG. 3. In some examples, an example computing device may not be incorporated in an PAAV.

In some examples, computing device 116B may be a server, tablet computing device, smartphone, wrist- or head-worn computing device, laptop, desktop computing device, vehicle head-unit, or any other computing device that may run a set, subset, or superset of functionality included in application 228. In some examples, computing device 116B may correspond to computing device 116 onboard PAAV 110, depicted in FIG. 1. For sake of illustration, components with like component numbers may include the structure and functionality of the respective components of FIGS. 1 and 2 and a description of such components is not repeated here.

In the example of FIG. 3, one or more of communication units 214 may receive, from an image capture device, an image of a pathway article that includes a code, such as code 127 of FIG. 1 and/or an article message, such as article message 126 in FIG. 1. In some examples, UI component 124 or any one or more components of application layer 224 may receive the image of the pathway article and store the image in image data 232.

In response to receiving the image, interpretation component 118 may determine that the image includes an image of a pathway article. In some examples, interpretation component 118 may determine that the image includes an image of a pathway article based on a code or an article message encoded on the pathway article, a size of the pathway article, shape of the pathway article, etc.

The pathway articles of this disclosure may include one or more codes, such as code 127 depicted in FIG. 1, to help determine if the pathway article is authentic or counterfeit. Code 127 may include authentication information to enable a computing device to validate or authenticate the authenticity of the pathway article.

According to techniques of this disclosure, in general, validation component 1050 determines whether a pathway article is counterfeit or authentic. In some examples, validation component 1050 may determine whether the pathway article is counterfeit or otherwise invalid based on one or more codes (e.g., code 127 of FIG. 1) of the pathway article. For example, code 127 may include authentication information. The authentication information may include an identifier associated with a hierarchical tree or hierarchical function (e.g., used in a blockchain). Validation component 1050 may determine whether the pathway article is counterfeit based at least in part on the authentication information.

In some examples, validation component 1050 determines whether the pathway article is counterfeit or authentic based on blockchain data. For example, validation component 1050 may determine whether the authentication information indicates the pathway article is valid by adapting techniques similar to those described in a whitepaper titled "A Next-Generation Smart Contract and Decentralized Application Platform"), available at https://github.com/ethereum/wiki/wiki/White-Paper and incorporated herein by reference in its entirety. Rather than operating as a cryptocurrency, the adaptations described in this disclosure may be used to identify counterfeit articles.

Validation component 1050 may determine whether article 108 is authentic or counterfeit based at least in part on the authentication information of article 108 and authentication information that is associated with one or more pathway articles represented by a blockchain. In some examples, computing device 116B stores authentication information for a plurality of pathway articles that are associated with a blockchain. For example, validation data 1052 may include at least a portion of a blockchain that includes authentication information for a plurality of pathway articles. In other words, in some instances, computing device 116B may be a node of a consensus network that stores the blockchain of authentication information for a plurality of pathway articles.

In another example, validation data 1052 may include a database that is generated from a blockchain of authentication information for a plurality of pathway articles. For example, computing device 116B may receive, from a computing system that stores the blockchain (e.g., a vehicle manufacturer, a governmental entity, etc.), authentication information corresponding to a plurality of pathway articles, such that computing device 116B may store the received authentication information in validation data store 1052. In this way, computing device 116B may not include the entire blockchain, but may include at least a portion of the authentication information representative of the state of the blockchain at a given point in time. In some examples, validation data store 1052 may include authentication information corresponding to a plurality of pathway articles in a particular geographic area (e.g., a particular city, county, state, etc.), for example, the geographic area in which computing device 116B is located.

Computing device 116B may receive additional or updated authentication information for one or more pathway articles. For instance, validation data 1052 may receive and store authentication information for a plurality of pathway articles within a particular geographic area (e.g., a city in which the vehicle frequently traverses). In some examples, computing device 116B may receive authentication information for pathway articles in a different geographic region. For example, a user of computing device 116B may plan to travel to a different geographic region (e.g., a road trip to another city or state) and may cause computing device 116B to request authentication information for the different geographic region. As another example, computing device 116B may determine the current location of computing device 116B, and may request from a computing system that stores the blockchain, authentication information for a plurality of pathway articles in a geographic area that includes the current location of computing device 116B. For example, computing device 116B may request authentication information for pathway articles in proximity to the current location of computing device 116B. Pathway articles may be considered in the same proximity as computing device 116B when the pathway article is within a threshold distance (e.g., 5 miles, 10 miles, 50 miles, etc.) of the current location of computing device 116B or is within the same geographic region (e.g., city, county, state, etc.) as the current location of computing device 116B. In some instances, computing device 116B may determine that whether validation data 1052 includes authentication information for at least one pathway article proximate computing device 116B and may request authentication information for only those pathway articles that are in the proximity of computing device 116B and which is not already stored in validation data store 1052.

Validation component 1050 determines whether article 108 is authentic or counterfeit based at least in part on the authentication information of article 108. For example, validation component 1050 may receive authentication information from interpretation component 118 and may determine whether article 108 is authentic or counterfeit based at least in part on the authentication information. The authentication information may include a unique identifier that is encoded in code 127 of article 108 and that corresponds to article 108. In some examples, validation component 1050 determines whether article 108 is authentic or counterfeit by comparing the unique identifier corresponding to article 108 to one or more unique identifiers stored in validation data 1052 (e.g., when validation data 1052 includes the blockchain, or includes data received from a computing system that includes the blockchain). In such examples, validation component 1050 may determine that article 108 is authentic if the unique identifier corresponding to article 108 corresponds to (e.g., matches) an identifier stored within validation data 1052. Similarly, validation component 1050 may determine that article 108 is not authentic (e.g., counterfeit) if the unique identifier corresponding to article 108 does not match an identifier within the validation data 1052.

In some examples, the authentication information corresponding to the pathway article includes a location of the pathway article. For example, computing device 116B may determine the current location of computing device 116B and may determine whether the pathway article is authentic based on the current location of computing device 116B and the expected location of the pathway article. For instance, validation component 1050 may query validation data 1052 or a remote computing system (e.g., the query may specify a unique identifier for the pathway article) to determine the expected location of the pathway article (e.g., a location where the pathway article was installed by an article installer, such as a road construction company, or governmental entity). Validation component 1050 may determine whether the current location of computing device 116B is within a threshold distance (e.g., 500 feet) of the pathway article. In other words, validation component 1050 may determine whether the actual location of the pathway article corresponds to the expected location of the pathway article. In some examples, responsive to determining that the current location of computing device 116B is within a threshold distance of the expected location of the pathway article, validation component 1050 may determine that the pathway article is authentic (e.g., not counterfeit). In some examples, validation component 1050 may utilize the location of the pathway article in addition to utilizing the unique identifier to determine whether the pathway article is authentic or counterfeit.

The authentication information corresponding to the pathway article may include a type of the pathway article. For example, interpretation component 118 may determine a type of the pathway article (e.g., a STOP sign, yield sign, pavement marking, etc.) and determine whether the pathway article is authentic based on the type of the pathway article. In some examples, interpretation component 118 may determine the type of the pathway article based on performing image recognition of the pathway article. As another example, interpretation component 118 may determine the type of the pathway article based on the authentication information encoded on the pathway article. For instance, the authentication information may specify the type of the pathway article. Validation component 1050 may query validation data 1052 or a remote computing system to determine the expected type of the pathway article (e.g., the query may specify a unique identifier for the pathway article). Validation component 1050 may compare the expected type of the pathway article to the determined type of the pathway article and may determine that the pathway article is authentic in response to determining that the expected type of the pathway article corresponds to (e.g., matches) the determined type for the pathway article. In some examples, validation component 1050 may utilize the type of the pathway article in addition to utilizing the unique identifier and/or location of the pathway article to determine whether the pathway article is authentic or counterfeit.

In some example, validation component 1050 may query (e.g., via communication unit 242) a remote computing system (e.g., operated by a vehicle manufacturer or governmental entity) to determine whether article 108 is authentic or counterfeit. For example, the remote computing system may store a blockchain or database based on the blockchain that includes authentication information associated with a plurality of pathway articles. Validation component 1050 may send authentication information (e.g., a unique identifier) corresponding to article 108 to the remote computing system to determine whether the authentication information corresponds to (e.g., matches) authentication information in the blockchain or database stored by the remote computing system. In some examples, the remote computing system determine whether the authentication information corresponding to pathway articles (e.g., a unique identifier of the pathway article, location of the pathway article, a type of the pathway article, or a combination therein) corresponds to authentication information stored within the blockchain or database that is part of the remote computing system.

In some instances, validation component 1050 receives a notification from the remote computing system indicating whether the authentication information corresponding to article 108 corresponds to (e.g., matches) authentication information within the blockchain or database. In such instances, validation component 1050 may determine that article 108 is authentic in response to receiving a notification indicating the authentication information corresponding to article 108 corresponds to the authentication information stored by the blockchain or database, and may determine that article 108 is not authentic (e.g., counterfeit) if the notification indicates the authentication information corresponding to article 108 does not correspond to the authentication information within the blockchain or database.

Responsive to determining that article 108 is not authentic (e.g., counterfeit), computing device 116 may execute a first action. For example, vehicle control component 144 may maintain the operation of PAAV 110 (e.g., by maintaining the current speed and trajectory of PAAV 110) in response to determining that article 108 is not authentic. In such examples, computing device 116B may adjust the driving operations of PAAV 110 according to other sensors, image capture devices, GPS, or information that is not based on the pathway article. As another example, service component 122 may send data to UI component 124 that causes UI component 124 to output an alert (e.g., audible, visual, etc.) that article 108 is not authentic. UI component 124 may send data to an output component of output components 216 that causes the output component to display the alert. In some instances, service component 122, or some other component of computing device 116B, may cause a message to be sent through communication units 214 that the pathway article is counterfeit. For instance, service component 122 may output an alert to a law enforcement agency, government agency (e.g., department of transportation), an entity responsible for maintenance of the vehicle pathway, other vehicles (e.g., vehicles nearby the pathway article), or any combination therein.

Responsive to determining that article 108 is authentic, computing device executes a second action (e.g., different from the first action). Thus, in response to determining that the pathway article is authentic, device 116 may output a notification (e.g., audible, visual, etc.), alter operation of the vehicle, or both. In some examples, vehicle control component 144 may alter the operation of PAAV 110 based on the authentication information and/or pathway information associated with article 108. For example, interpretation component 118 may determine, based on the authentication information corresponding to the pathway article, that the type of the pathway article is a stop sign. For instance, UI component 124 may output a visual notification (e.g., via a display component) to one or more of occupants of the PAAV 110 indicating that the pathway article is a STOP sign and/or vehicle control component 144 may bring PAAV 110 to a stop. In some examples, interpretation component 118 may determine, based on pathway information corresponding to the pathway article (e.g., pathway information stored in a blockchain), that the pathway article indicates a speed limit (e.g., 40 MPH). Thus, vehicle control component 144 may adjust the speed of the vehicle in response to determining that the pathway article is authentic. In some examples, computing device 116B may combine the pathway information and/or authentication information with other information from other sensors, such as image capture devices, GPS information, information from network 114 and similar information to adjust the speed, suspension or other functions of the vehicle through vehicle control component 144. In some examples, validation component 1050 stores an indication whether the pathway article is authentic or counterfeit in validation data 1052 for later access by sources internal or external the vehicle.

Validation component 1050 query a data structure associated with a blockchain that stores pathway information for one or more portions of vehicle pathways. In some examples, validation data 1052 may include pathway information associated with a portion of a vehicle pathway (e.g., pathway 106 of FIG. 1). For example, validation data 1052 may include a blockchain that includes pathway information for a plurality of portions of vehicle pathway or may include a database or other data structure that represents the status of a blockchain of pathway information at a given point in time. Validation component 1050 may query validation data 1052 to determine one or more characteristics of a vehicle pathway proximate the current location of computing device 116B. For example, computing device 116B may determine its current location (e.g., via GPS) and validation component 1050 may send an indication of the current location to validation data 1052 to retrieve information describing the characteristics of the vehicle pathway in the proximity of (e.g., within a threshold distance, within the same geographic region such as the same city, county, or state) computing device 116B.

In some examples, validation component 1050 may query a remote computing system (e.g., a vehicle manufacturer, governmental entity, etc.) that operates as a node of a consensus network or provides access to the consensus network to request pathway information for one or more portions of a vehicle pathway. For instance, validation component 1050 may send an indication of the current location of computing device 116B to a remote computing system and may receive pathway information in response.

Responsive to receiving the pathway information, vehicle control component 144 may control operation of the vehicle based on the received pathway information. For instance, vehicle control component 144 may determine that the vehicle pathway includes an intersection and may slow the vehicle to turn at the intersection. In some examples, vehicle control component 144 may control the vehicle based on the received pathway information in addition to (or in lieu of) information received from one or more vehicle sensors. For instance, by utilizing the pathway information associated with a blockchain to control operation of a vehicle, computing device 116B may not require additional sensors, which may reduce the cost and/or complexity of manufacturing a vehicle. Utilizing the pathway information associated with the blockchain in addition to one or more vehicle sensors may provide redundancy and increase safety of the vehicle.

Figure 4:
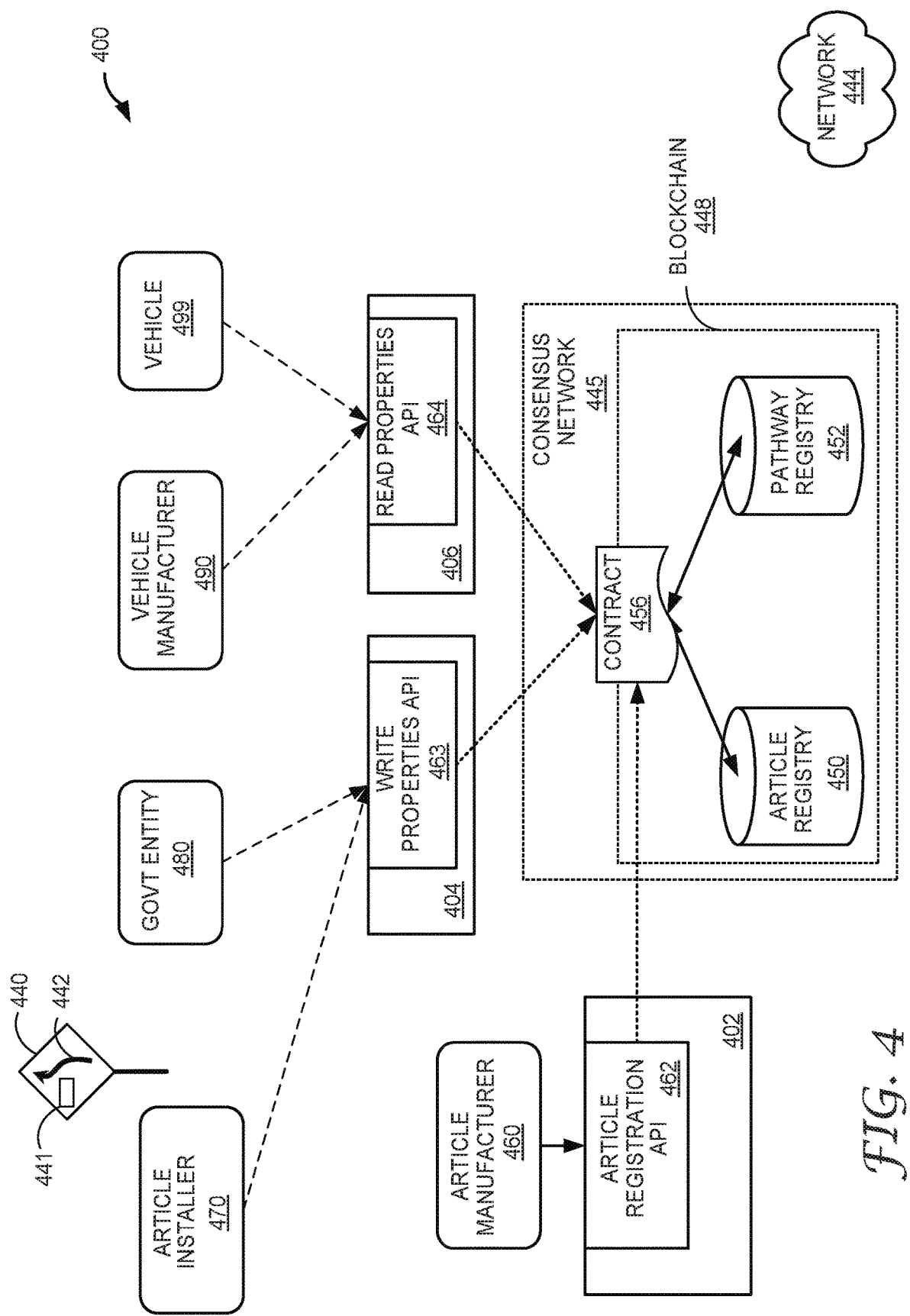
FIG. 4 is a block diagram depicting a system for authenticating an article, according to techniques described in this disclosure.

FIG. 4 is a block diagram depicting a system for authenticating an article, according to techniques described in this disclosure. System 400 in this example includes a consensus network 445 having a blockchain 448, as well as computing devices 402, 404, 406 that present respective article registration API 462, write properties API 463, and authentication API 464 for interacting with the consensus network 445 to register and authenticate transactions with the blockchain 448 using one or more smart contracts 456.

Article 440 represents an example of article 108 of FIG. 1. In some examples, article 440 is a sheeting. Article 440 may be a pathway article, such as a traffic sign (e.g. a STOP sign, YIELD sign, mile marker, etc.), pavement marking, license plate, etc. In some examples, article 440 may comprise a pathway article that includes a sheeting.

Consensus network 445 is a network of computing devices (or "nodes") that implement a blockchain 448. Computing devices (not shown in FIG. 4) of the consensus network may represent any computing device able to execute smart contract 456. Consensus network 445 may, for instance, represent an Ethereum network of Ethereum virtual machines (EVMs), also known as an Ethereum blockchain platform, executing on hardware computing devices. Although only one smart contract 456 is illustrated, consensus network 445 may store and execute multiple different smart contracts 456 to facilitate the article registration and authentication techniques described herein.

Blockchain 448 is a shared transactional database that includes a plurality of blocks, each block (other than the root) referencing at least one block created at an earlier time, each block bundling one or more transactions registered with the blockchain 448, and each block cryptographically secured. Consensus network 445 receives transactions from transaction senders that invoke smart contract 456 to modify the blockchain 448. Consensus network 445 uses blockchain 448 for verification. Each block of blockchain 448 typically contains a hash pointer as a link to a previous block, a timestamp, and the transaction data for the transactions. By design, blockchains are inherently resistant to modification of the transaction data. Functionally, blockchain 448 serves as a distributed ledger that can record transactions between parties efficiently and in a verifiable and permanent way.

Consensus network 445 may be a peer-to-peer network that manages blockchain by collectively adhering to a protocol for validating new blocks. Once recorded, the data in any given block of blockchain 448 cannot be altered retroactively without the alteration of all subsequent blocks and a collusion of a majority of the consensus network 445. Only one blockchain 448 is illustrated for simplicity, but multiple blockchains 448 may be used with the described techniques.

Contract 456 may represent a so-called "smart contract." Contract 456 represents an executable script or program for performing a transaction for a party, or between parties, to modify state of blockchain 448. In examples of consensus network 445 that are Ethereum networks, contract 456 represents one or more autonomous scripts or one or more stateful decentralized applications that are stored in Ethereum blockchain 448 for later execution by the nodes of consensus network 445.

Contract 456 includes operations for modifying and viewing transaction data registered to blockchain. Such transaction data is categorized in FIG. 4 as article registry 450 and pathway registry 452. Blockchain 448 may store all data for article registry 450 and pathway registry 452 to a single blockchain address, or to multiple blockchain addresses, e.g., one address per registry/database. In the case of multiple blockchain addresses, contract 456 may represent multiple corresponding contracts.

System 400 includes a network 444 to transport data communications among computing devices of system 400. Network 444 may include the Internet. Communication links between network 444 and computing devices of system 400 are omitted from FIG. 4.

System 400 includes computing devices 402, 404, and 406. Each of computing devices 402, 404, and 406 presents a different application programming interface (API) for reading or modifying blockchain 448 using contract 456. Computing devices 402, 404, and 406 may communicate with consensus network 445 to request a new blockchain 448 transaction, to read transaction data, or to request consensus network 445 to perform another operation. Computing devices 402, 404, and 406 may send and receive data via network 444 to and from consensus network 445 using JavaScript Object Notation remote procedure call (JSON-RPC), a stateless light-weight remote procedure call. JSON-RPC may operate over sockets, over HyperText Transfer Protocol, or in other message passing environments. Computing devices 402, 404, and 406 may send and receive data for APIs 462, 463, and 464 via network 444. In some cases, a computing device may execute multiple of APIs 462, 463, and 464.

Computing device 402 presents article registration API 462, which presents methods for registering an article to blockchain 448. For example, article registration API 462 may include a register method configured to receive authentication information corresponding to article 440. The authentication information may include a unique identifier corresponding to article 440, a location of article 440 (e.g., a location where article 440 is installed, also referred to as an expected location), a type of article 440 (e.g., stop sign, yield sign, mile marker, etc.), etc.

An application (not shown) executed by computing device 402 may receive data invoking the register method of article registration API 462 and including data including the authentication information and, in some cases, other article information. The application of computing device 402 may send the authentication information to consensus network 445, at an address for contract 456, to invoke a register method of contract 456. The register method of contract 456 is configured to cause consensus network 445 to receive the authentication information corresponding to an article by adding at least one transaction to article registry 450 of blockchain 448. For example, article manufacturer(s) 460 may invoke the register method of article registration API 426 to register an article 440.

Article manufacturer 460 manufactures articles, e.g., article 440, where each article includes a code 441 representing respective authentication information ((e.g., printed on a surface of the article 440). For instance, article 440 may be a sheeting and the code 441 may be printed, etched, or otherwise included on the sheeting. In another instance, article 440 may be a pathway article (e.g., a traffic sign, a pavement marking, a license plate, etc.) where the code 441 is printed, etched, or otherwise included on the pathway article.

An operator, agent, or device controlled by article manufacturer 460 uses a computing device (e.g., computing device 116A) to register each article 440 and the respective authentication information represented by the code 441 by invoking the register method of article registration API 462. Computing device 402, in turn, invokes the register method of contract 456 with the particular authentication information corresponding to article 440. Consensus network executes the register method to add a transaction to the blockchain 448 that modifies article registry 450 to add the authentication information to blockchain 448. For example, article registry 450 represents blocks of blockchain 448 that store authentication information corresponding to a respective article of a plurality of articles 440. In addition to the authentication information corresponding to a respective article, information registered to article registry 450 using article registration API 462 may include other descriptive information associated with a particular article 440, such as manufacturing date, lot number, manufacturer, article specifications, a sign description, and a MUTCD data. Such data may be received and processed by the various methods, similarly to the authentication information for the article.

Computing device 404 presents write properties API 463 that includes at least one method for registering properties of article 440, pathway 106, or both. For example, write properties API 463 may include an article properties method with which an article installer 470 (e.g., a road construction company) or governmental entity 480 (e.g., a department of transportation) may register properties of article 440. For example, the article properties method may enable article installer 470 or governmental entity 480 to associate authentication information corresponding to article 440, such as a type of article 440 (e.g., STOP sign, YIELD sign, speed limit sign, etc.), or location (e.g., GPS coordinates, city, state, intersection, etc.) at which article 440 is originally installed (also referred to as the expected location of article 440) with a unique identifier corresponding to article 440. In some examples, the article properties method may enable an entity to specify other information about article 440, such as installation date, article standards information (e.g., information specified in the Manual on Uniform Traffic Control Devices (MUTCD)), etc.

Applications (not shown) executed by computing device 404 respond to write properties API 463 invocation by invoking contract 456 to cause consensus network 445 to read or modify blockchain 448. For example, an operator, agent, or device controlled by an article installer 470 and/or governmental entity 480 uses a computing device (e.g., computing device 116A) to invoke write properties API 463, specifying the additional information about article 440 in order to cause the additional information about article 440 to be associated with article 440 within blockchain 448.

In other words, the article properties method may permit article installers 470, governmental entity 480, or other user to specify additional information about article 440. In such cases, the article properties method is configured to receive the additional authentication information associated with article 440 and invoke a corresponding method of contract 456 to cause consensus network 445 to register an association between first authentication information (e.g., a unique identifier) corresponding to article 440 and second authentication information corresponding to article 440 in article registry 452 by adding at least one transaction to blockchain 448.

In some examples, article 440 includes pathway information 442. Write properties API 463 may include a pathway properties method with which article installer 470 or governmental entity 480 may register properties of a pathway (e.g., pathway 106 of FIG. 1). For example, the pathway properties method may enable article installer 470 or governmental unit 480 to specify pathway information about a particular portion of pathway 106, such as a location (e.g., GPS coordinates), number of lanes, lane width, speed limit, pathway grade or slope, pathway curvature, etc. An application executed by computing device 404 may respond to the invocation of the pathway method of write properties API 463 by invoking contract 456 to cause consensus network 448 to register pathway information about the particular portion of pathway 106. In some examples, invocation of the pathway method may cause consensus network 445 to register an association between authentication information corresponding to article 440 and pathway information.

Computing device 406 presents Read Properties API 464 by which parties may request information from blockchain 448. In some examples, read properties API 464 includes an authentication method configured to receive authentication information for an article and return an indication of whether the consensus network 445 is able to authenticate the article.

Computing device 406 may receive data invoking the authentication method of authentication API 464 and including authentication information for an article for which authentication is being requested. Computing device 406 may send data including the authentication information for the article to consensus network 445, at an address for contract 456, to invoke a corresponding authentication method of contract 456. The authentication method of contract 456 is configured to cause consensus network 445 to review transactions in blockchain 448 to determine whether the authentication information corresponding to article 440 exists within article registry 450 of blockchain 448. For example, the authentication method of contract 456 may compare the authentication information corresponding to article 440 to authentication information stored by article registry 450 to determine whether the authentication information corresponding to article 440 corresponds to (e.g., matches) a authentication information within article registry 450. In some examples, the existence of the authentication information corresponding to article 440 within article registry 450 may indicate that article 440 is authentic. In other words, responsive to determining that the authentication information corresponding to article 440 corresponds to authentication information within article registry 450, authentication API 464 may return an indication that the article 440 is authentic. However, in some examples, if the authentication method determines that the authentication information corresponding to article 440 does not correspond to authentication information within article registry 450, authentication API 464 may output an indication that the article 440 is not authentic (e.g., is counterfeit).

In some examples, authentication API 464 may utilize additional information in determining whether article 440 is authentic. For example, the data received by computing device 406 may include an indication of the type of article 440 and/or a location of article 440. Computing device 406 may invoke the authentication method of contract 456 cause consensus network 445 to compare the type of article 440 with an expected type of article for article 440 as stored within article registry 440. In some example, authentication API 464 may output an indication that article 440 is not authentic (e.g., is counterfeit) in response to the authentication method determining that the type of article 440 does not correspond to the expected type of article 440 as stored within article registry 450 (e.g., even if the authentication information corresponding to article 440 matches authentication information within article registry 450). Similarly, authentication API 464 may output an indication that article 440 is authentic in response to the authentication method determining that the type of article 440 corresponds to the expected type of article 440 as stored within article registry 450 (e.g., in further response to determining the authentication information corresponding article 440 matches a authentication information within article registry 450).

As another example, computing device 406 may invoke the authentication method of contract 456 to cause consensus network 445 to compare a location of article 440 (e.g., GPS coordinates, city, state, intersection, etc.) with an expected location of article 440 as stored within article registry 440. In some example, authentication API 464 may output an indication that article 440 is authentic in response to the authentication method determining that the location of article 440 corresponds to (e.g., is within a threshold distance of) the expected location of article 440 as stored within article registry 450 (e.g., and in further response to determining the authentication information corresponding to article 440 matches a authentication information within article registry 450). Similarly, authentication API 464 may output an indication that article 440 is not authentic in response to the authentication method determining that the location of article 440 does not correspond the expected location of article 440 as stored within article registry 450 (e.g., even if the authentication information corresponding article 440 matches authentication information within article registry 450).

In some examples, read properties API 464 includes a lookup method configured to receive location information for an article and return pathway information based on the location information. For example, computing device 406 may receive data invoking the lookup method of authentication API 464 and including location information, such as a location (e.g., GPS coordinates, city, state, intersection, etc.) of vehicle 499. Computing device 406 may send data including the location information to consensus network 445, at an address for contract 456, to invoke a corresponding lookup method of contract 456. The lookup method of contract 456 is configured to cause consensus network 445 to review transactions in blockchain 448 to determine pathway information associated with a location of vehicle 499. For example, the lookup method of contract 456 may compare a location of vehicle 499 to blocks within blockchain 448 to determine whether pathway registry 452 of blockchain 448 includes data for locations proximate (e.g., within a threshold distance, within the same city, etc.) the location of vehicle 499. In some instances, the lookup method may return pathway information for one or more portions of pathway proximate the location of vehicle 499. Responsive to receiving the pathway information, vehicle 499 may output (e.g., audibly, visually) at least a portion of the pathway information for the one or more portions of pathway proximate the location of vehicle 499. In some examples, vehicle 499 may control or adjust operation of vehicle 499 in response to receiving the pathway information. For example, vehicle 499 may receiving pathway information indicating that the pathway includes a curve and may turn the wheels of vehicle 499 to navigate through the curve. In this way, vehicle 499 may control vehicle 499 based on pathway information received from blockchain 448 in addition to, or in replacement of, information received by sensors of vehicle 499.

In some examples, one or more of article installers 470, government entities 480, vehicle manufacturers 490, and/or vehicles 499 may be a node within consensus network 445 and may host a copy of blockchain 448. For example, various government entities (e.g., city, county, or state governments, such as a Department of Transportation) may store blockchain 448.

In some examples, vehicle 499 may be included within consensus network 445 and may store a copy of blockchain 448. In such examples, vehicle 499 may authenticate an article 440 by directly traversing article registry 450 of blockchain 448. In some examples, vehicle 499 may authentic an article 440 by receiving data from another entity (e.g., an entity that stores the blockchain). In some scenarios, vehicle 499 may receive information from vehicle manufacturer 490 (or other entity) used to authenticate article 440. For instance, the vehicle 499 may receive authentication information (e.g., a unique identifier, location, and/or type of article) corresponding to one or more articles, and may query a local copy of the authentication information to determine whether the particular article is authentic. In some instance, vehicle 499 may send authentication information for article 440 to the manufacturer 490 (or other entity) and may receive a notification from manufacturer 490 indicating whether the article 440 is authentic or counterfeit.

Figure 5:
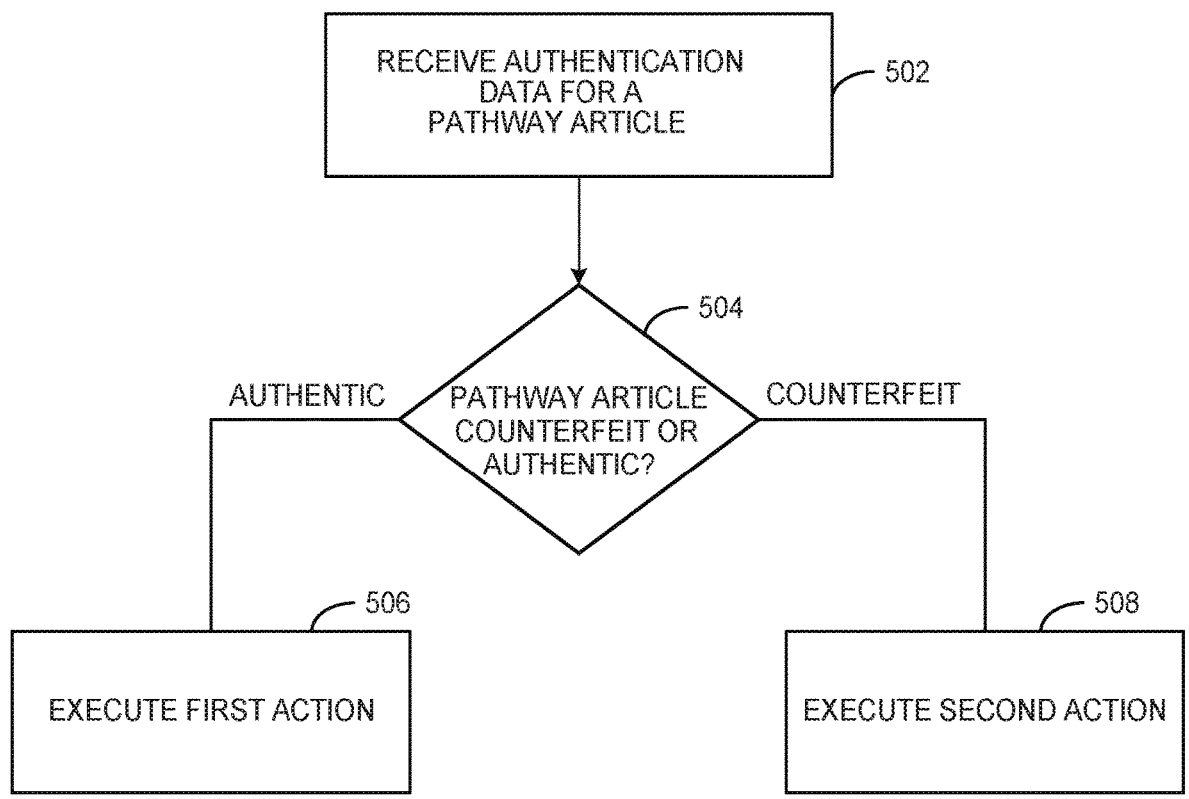
FIG. 5 is a flow diagram illustrating example operations of a computing device of a PAAV configured to authenticate a pathway article, in accordance with one or more techniques of this disclosure.

FIG. 5 is a flow diagram illustrating example operations of a computing device configured to authenticate a pathway article, in accordance with one or more techniques of this disclosure. The techniques are described in terms of computing device 116B of FIG. 3. However, the techniques may be performed by other computing devices.

Computing device 116B may receive authentication information for a vehicle pathway article (502). In some examples, computing device 116B receives the authentication information from an image capture system (e.g., LIDAR or other systems that capture light in the visible and/or infrared spectrums). For example, image capture circuitry 102C may capture one or more images of a pathway article. Interpretation component 118 may detect a code 127 that includes authentication information in at least one of the images.

Computing device 116B may determine whether the pathway article is counterfeit or authentic (504). In some examples, validation component 1050 of computing device 116B may determine whether the pathway article is counterfeit based on the authentication information. For example, validation component 1050 may compare the authentication information encoded in code 127 of a pathway article to information associated with a blockchain that stores authentication information for a plurality of pathway articles. As one example, validation data 1052 may include the blockchain or may include a representation of the state of the blockchain at a point in time. In some examples, validation component 1050 queries validation data 1052 to determine whether the authentication information for the pathway article corresponds to (e.g., matches) authentication information stored in validation data 1052. Validation component

1050 may determine that the pathway article is authentic in response to determining that the authentication information for the pathway article corresponds to authentication information stored in validation data 1052. In some examples, validation component 1050 determines that the pathway article is not authentic (e.g., counterfeit) in response to determining that the authentication information for the pathway article does not correspond to authentication information stored in validation data 1052.

Responsive to determining the pathway article is authentic ("AUTHENTIC" branch of 504), computing device 116B may execute a first action (506). For example, computing device 116B may adjust the driving operations of PAAV 110. In other words, computing device 116B may adjust the speed, suspension or other functions of the vehicle through vehicle control component 144 in response to determining that the pathway article is valid.

Responsive to determining the pathway article is counterfeit ("COUNTERFEIT" branch of 504) or not authentic, computing device 116B may execute a second action (508). For instance, computing device 116B may refrain from adjusting one or more functions or driving operations of PAAV 110. In other words, computing device 116B may maintain the speed, steering, or other driving functions and may adjust the driving operations of PAAV 110 according to other sensors, image capture devices, GPS, or information that does not include the pathway article. Computing device 116B may output a notification indicating the pathway article is not valid. For example, computing device 116B may output, for display by a display device of PAAV 110, a graphical indication that the pathway article is not valid. For instance, service component 122 may send data to UI component 124 that causes UI component 124 to generate an alert for display in response to determining that the pathway article is a counterfeit. UI component 124 may send data to an output component of output components 216 that causes the output component to display the alert. Computing device 116B may send a message (e.g., to law enforcement, a government agency such as a highway department, etc.) indicating the pathway article is not valid.

Figure 6:
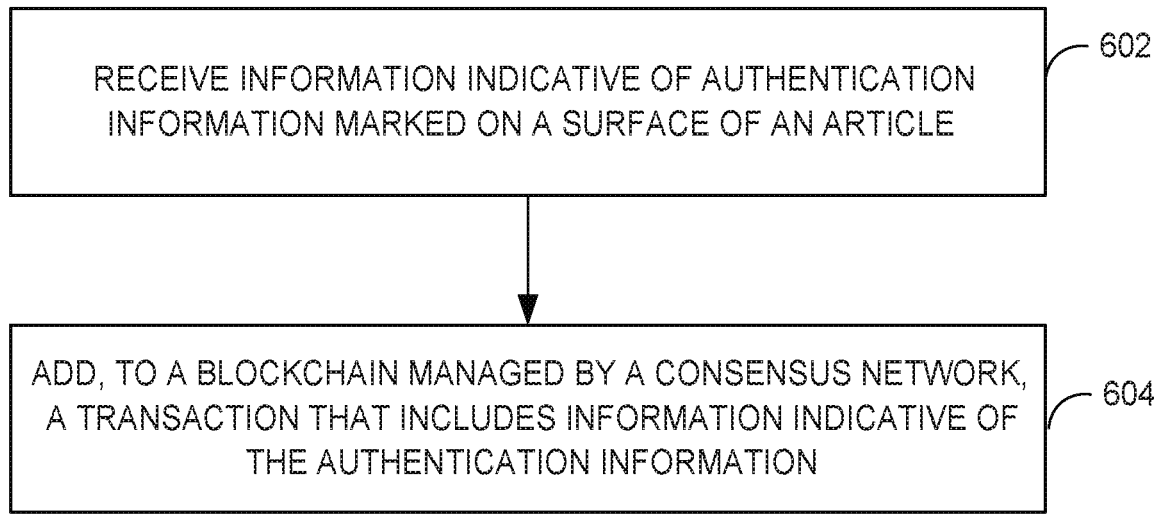
FIG. 6 is flowchart illustrating an example mode of operation for a consensus network, according to techniques of this disclosure.

FIG. 6 is flowchart illustrating an example mode of operation for a consensus network, according to techniques of this disclosure. The operations are described with respect to elements of system 400 of FIG. 4 but may be applied by systems having different architectures.

Blockchain 148 stores a smart contract 156 at a blockchain address. At least one node of the consensus network 445 receives information indicative of authentication information encoded on a code 441 marked on a surface on an article 440 (602). For example, the authentication information may include a unique identifier corresponding to article 440, an expected location of article 440, a type of article 440, or a combination therein.

Consensus network 445 executes the register method of smart contract 456 to add a transaction to article registry 450 of blockchain 448 (604).

Figure 7:
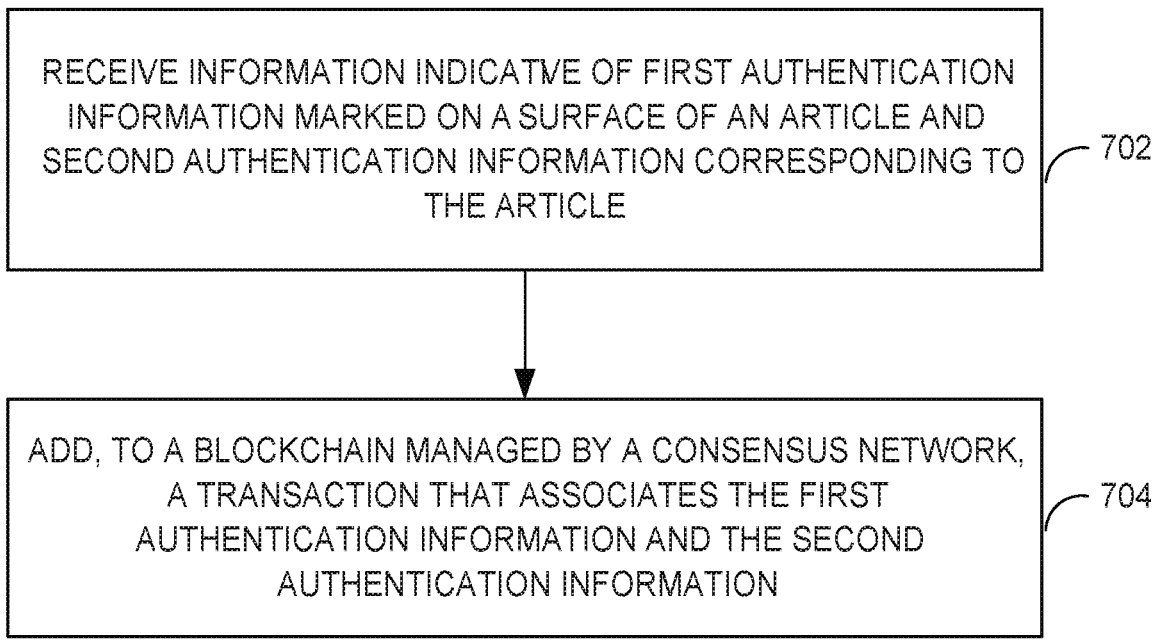
FIG. 7 is flowchart illustrating an example mode of operation for a consensus network, according to techniques of this disclosure.

FIG. 7 is flowchart illustrating an example mode of operation for a consensus network, according to techniques of this disclosure. The operations are described with respect to elements of system 400 of FIG. 4 but may be applied by systems having different architectures.

Blockchain 448 stores a smart contract 456 at a blockchain address. At least one node of the consensus network 445 receives an indication of first authentication information encoded in a code 441 marked on a surface of article 440 and second authentication information corresponding to article 440 (702). For example, the first authentication information may include a unique identifier corresponding to article 440 and the second authentication information may include an expected location of article 440, a type of article 440, or both.

Consensus network 445 executes the article properties method of smart contract 456 to add a transaction to article registry 450 of blockchain 448 that associates the first authentication information with the second authentication information (704).

Figure 8:
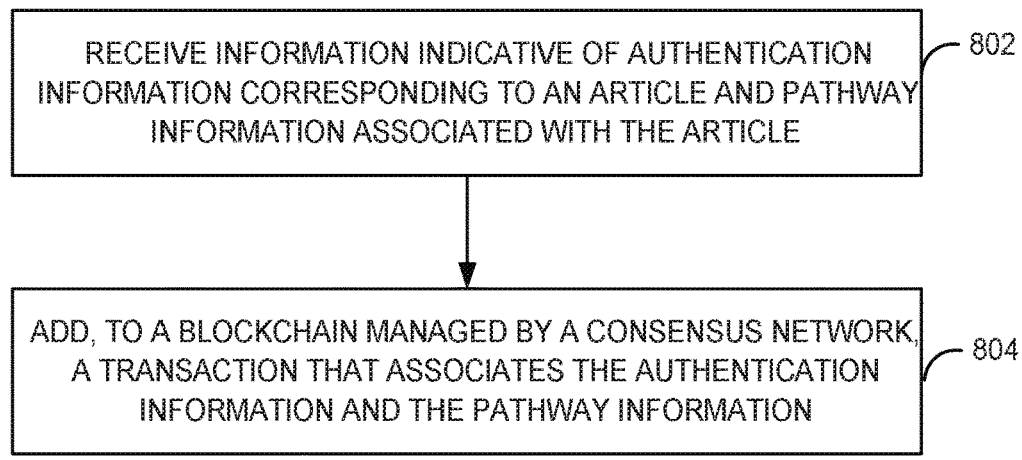
FIG. 8 is flowchart illustrating an example mode of operation for a consensus network, according to techniques of this disclosure.

FIG. 8 is flowchart illustrating an example mode of operation for a consensus network, according to techniques of this disclosure. The operations are described with respect to elements of system 400 of FIG. 4 but may be applied by systems having different architectures.

Blockchain 448 stores a smart contract 456 at a blockchain address. A node of consensus network 445 receives authentication information corresponding to an article and pathway information corresponding to a pathway associated with the article (802).

Consensus network 445 executes the pathway properties method of smart contract 456 to add a transaction to pathway registry 450 of blockchain 448 that associates the authentication information with the pathway information (804).

Figure 9:
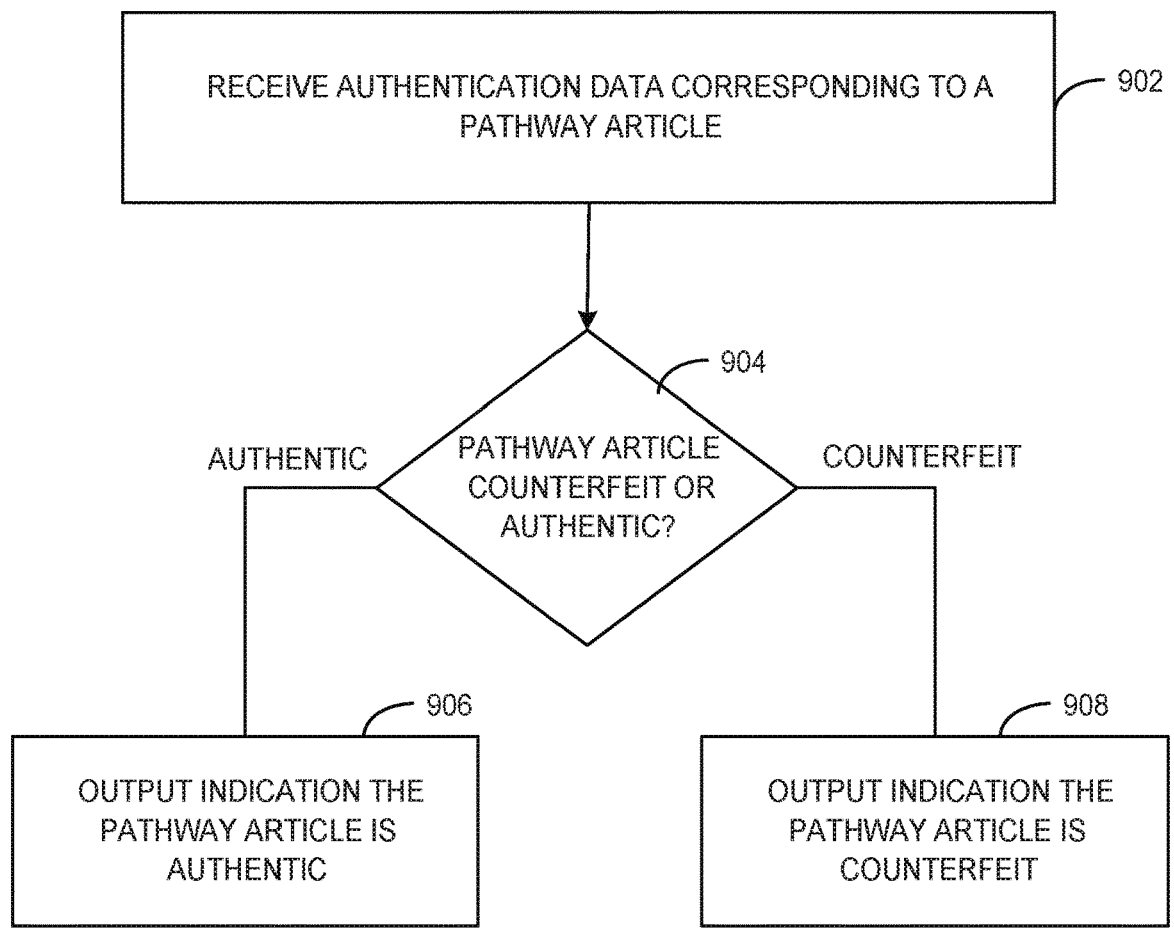
FIG. 9 is flowchart illustrating an example mode of operation for a consensus network, according to techniques of this disclosure.

FIG. 9 is flowchart illustrating an example mode of operation for a consensus network, according to techniques of this disclosure. The operations are described with respect to elements of system 400 of FIG. 4 but may be applied by systems having different architectures.

Blockchain 448 stores a smart contract 456 at a blockchain address. A node of consensus network 445 receives a request for authentication of an article 440, the request specifying authentication information corresponding to the article (902). For example, a computing device, such as computing device 116B as illustrated in FIG. 3, may detect a pathway article via one or more image capture devices 102 and may send a request for authentication of the detected article. For instance, the request may include an indication of a unique identifier encoded in a code 441 on the pathway article, a location of the vehicle when the pathway article was detected, a type of the pathway article, or a combination therein.

Consensus network 445 executes the article properties method of smart contract 456 to determine whether the article is authentic or counterfeit (904). A node of the consensus network may determine whether the article is authentic based at least in part on a unique identifier corresponding to the detected pathway article. For example, a node of the consensus network may determine that article 108 is authentic if the unique identifier corresponding to the detected article corresponds to (e.g., matches) an identifier stored within the blockchain managed by the consensus network, or may determine that the article is not authentic (e.g., counterfeit) if the unique identifier corresponding to the detected article does not correspond to an identifier stored within the blockchain.

In some examples, the consensus network determines whether the detected pathway article is authentic further based on additional authentication information, such as a location of a computing device that detects the pathway article, a type of the pathway article, or both.

For example, a node of consensus network 445 may receive an indication of the location of computing device 116B that detects the pathway article and may determine whether the current location of computing device 116B is within a threshold distance (e.g., 500 feet) of the expected or installed location of the pathway article. In other words, validation component 1050 may determine whether the actual location of the pathway article corresponds to the expected location of the pathway article (e.g., as indicated by the blockchain data). The node of the consensus network 445 may determine that the pathway article is authentic (e.g., not counterfeit) in responsive to determining that the location of computing device 116B is within a threshold distance of the expected location of the pathway article. However, consensus network 445 may determine the pathway article is not authentic (e.g., counterfeit) in responsive to determining that the location of computing device 116B is not within a threshold distance of the expected location of the pathway article.

In another example, a node of the consensus network may determine that the pathway article is not authentic based on a type of the detected pathway article. For example, interpretation component 118 may determine a type of the pathway article (e.g., a STOP sign, yield sign, pavement marking, etc.) and send an indication of the type of the article to the consensus network as part of the authentication request. A node of the consensus network 445 may compare the expected type of the pathway article (as indicated by the blockchain data) to the determined type of the pathway article and may determine that the pathway article is authentic in response to determining that the expected type of the pathway article corresponds to (e.g., matches) the determined type for the pathway article. However, consensus network 445 may determine the pathway article is not authentic (e.g., counterfeit) in responsive to determining that the type of the detected pathway article does not correspond to the expected type.

Consensus network 445 outputs an indication of whether the article is authentic or counterfeit. For example, responsive to determining that the article is authentic ("Authentic" branch of 904), consensus network 445 outputs an indication that the article is authentic (906). For example, a node of consensus network 445 may send a notification to computing device indicating the article is authentic.

Responsive to determining that the article is not authentic or is counterfeit ("Counterfeit" branch of 904), consensus network 445 outputs an indication that the article is not authentic (908). For example, a node of consensus network 445 may send a notification to computing device indicating the article is not authentic.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples of the disclosure have been described. These and other examples are within the scope of the following claims.

The invention claimed is:

1. A method comprising:
   receiving, by a computing device of a pathway-article assisted vehicle (PAAV) and from an image capture device of the PAAV, an image of a code embodied on a pathway article, wherein the code is associated with authentication information stored to a distributed blockchain network, wherein the authentication information stored to the distributed blockchain network includes a first unique identifier corresponding to the pathway article and an expected type of the pathway article;

determining, by the computing device, based at least in part on the code and the authentication information associated with the code and stored to the distributed blockchain network, whether the pathway article is authentic or counterfeit by:

determining, by the computing device, whether a second unique identifier included in the code corresponds to the first unique identifier stored by the distributed blockchain network and whether a type of the pathway article corresponds to the expected type of the pathway article stored by the distributed blockchain network; and determining that the pathway article is authentic in response to determining that the second unique identifier included in the code corresponds to the first unique identifier stored by the distributed blockchain network and that the type of the pathway article corresponds to the expected type of the pathway article stored by the distributed blockchain network; and executing, by the computing device, an action based on the determination.

2. The method of claim 1, wherein the article message further comprises:

pathway information that indicates one or more characteristics of a vehicle pathway, wherein the pathway information provides a human-perceptible representation that is descriptive of at least a portion of the vehicle pathway or vehicle operation instructions associated with the portion of the vehicle pathway.

3. The method of claim 1, wherein performing the action comprises maintaining the vehicle operation in response to determining that the pathway article is counterfeit.

4. The method of claim 1, wherein performing the action comprises adjusting the vehicle operation in response to determining that the pathway article is authentic.

5. The method of claim 1, wherein the authentication information further includes an expected location of the pathway article, the method further comprising:

determining, by the computing device, an actual location of the PAAV, wherein determining whether the pathway article is authentic or counterfeit further comprises:

determining, by the computing device, whether the expected location of the pathway article is within a threshold distance of the actual location of the PAAV, and determining that the pathway article is authentic in further response to determining that the expected location of the pathway article is within the threshold distance of the actual location of the PAAV.

6. The method of claim 1, wherein determining the type of pathway article includes at least one of:

performing image recognition of the pathway article, or determining authentication information encoded on the pathway article.

7. The method of claim 6, wherein receiving the authentication information corresponding to the plurality of pathway articles in the geographical area includes receiving authentication information for the plurality of pathway articles within a predetermined radius of the current location of the PAAV.

8. The method of claim 1, further comprising storing, by the computing device, the blockchain.

9. The method of claim 1, further comprising:

receiving, by the computing device and from a computing system that stores the blockchain, authentication information corresponding to a plurality of pathway articles in a geographical area that includes a current location of the PAAV.

* * * * *